Patented July 26, 1949

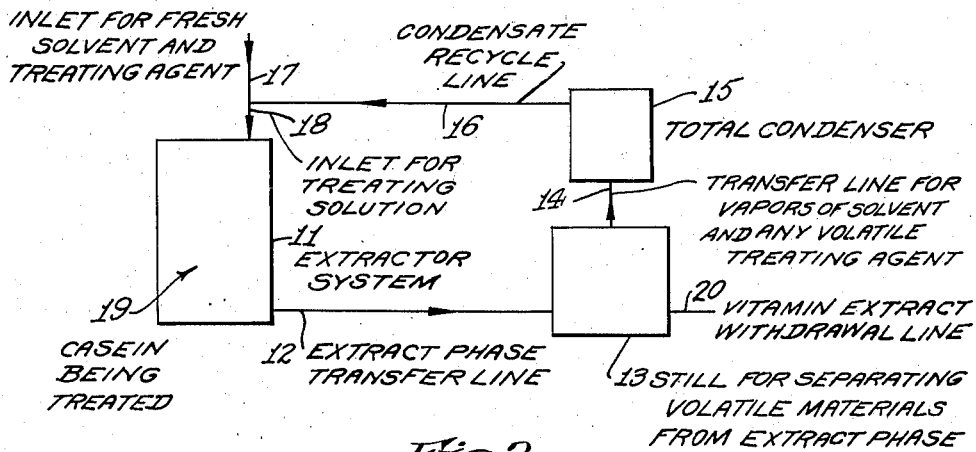
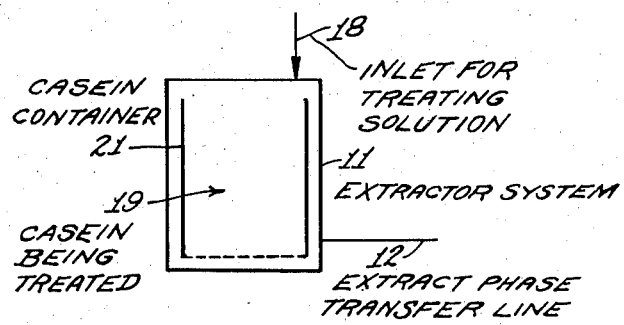

2,477,505

UNITED STATES PATENT OFFICE 2,477,505

PRODUCTION OF DEVITAMINIZED CASEIN BY SOLVENT EXTRACTION

Samuel M. Weisberg and Joseph Greenspan, Baltimore, Md., assignors, by mesne assignments, to National Dairy Research Laboratories, Inc., New York, N. Y., a corporation of Delaware Application October 18, 1945, Serial No. 623,146

6 Claims. (Cl. 167—81)

This invention relates to the separation of vitamins from a casein, such as commercial casein. More particularly, it relates to a simple and rapid method for the production of edible casein substantially free from all known vitimans. It especially relates to the production of so-called vitamin-free basal diet casein.

Vitamin free casein has many uses. It is valuable in the production of bacteriological media. It is particularly valuable in the preparation of a basal diet for animal feeding tests, such as tests made to determine the effect of vitamin deficient diets. Various methods have been proposed heretofore for the production of substantially vitamin free casein. In general, these methods are subject to several disadvantages. Most of them are slow, tedious and cumbersome. Some of them tend to alter the molecular structure of the casein, thereby altering its value for experimental feeding purposes.

In general, the methods used heretofore employ a series of washings or leachings, such as with water acidified with acetic acid, followed by alcohol washes. This method usually takes from about 7 to about 10 days. Some methods use a highly concentrated aqueous solution of a salt, such as sodium chloride, to leach out the vitamins and follow this with washings with acetic solutions and then with water; these are also slow and cumbersome. Other methods involve autoclaving long periods of time, or successive solution of the casein in alkali and precipitation of the casein by acidification; these methods tend to degrade the molecular structure of the casein, thereby altering its value for feeding purposes. Known processes employing an alcohol as the leaching agent are very time-consuming, often requiring as much as two weeks to produce a suitable so-called vitamin free casein.

Experimental attempts to prepare a vitamin free casein by treating with a large amount of alkali to substantially disperse the casein and extracting with an alcohol, followed by acidifying the casein to lower the pH of the product gave a product which was of dark color and which contained many very dark yellowish or orange colored granules; the latter gave the product a very undesirable appearance. Furthermore, the vitamins were destroyed in such a treatment, and were not recoverable.

It is an object of the invention to provide a process for the production of a substantially vitamin-free, high quality, basal diet casein.

It is another object of the invention to provide a simple, rapid and efficient process for the separation of vitamins from casein, such as commercial casein.

It is another object of the invention to provide an easily controlled, rapid process for recovering the vitamins from casein, such as commercial casein.

Other objects of the invention will become apparent as it is more fully developed hereinafter.

It has now been found, in accordance with the invention, that if casein is contacted or extracted with a selective solvent while the pH of the casein is controlled within a critical range, the extractive efficiency of the solvent is very markedly increased and surprisingly indeed, there is no degrading effect on the casein. Thus, the extraction time is markedly reduced and a superior product is obtained.

It has been found that, if dried granular, commercial casein is treated with an alkaline agent, such as an alkaline agent in a alcohol solution, and the pH of the casein brought within the range of about 4.7 to about 6.0 and preferably within the range of about 4.8 to about 5.5, that the granules will become swollen but they will not become gelatinous or soluble, and that if this swollen granular casein is extracted with a selective solvent, such as methanol, the vitamin content is very rapidly removed, or desorbed from the casein. The alkaline agent treatment and the extraction may be and preferably are carried out simultaneously. The extract phase which is removed from the casein may be distilled to drive off the solvent and other volatile materials and the vitamins may be obtained or recovered as or from the still residue. The vaporized solvent may be recondensed and re-used in the extraction system. If the alkaline agent is volatile, it may be distilled off with the solvent and reused and if not may be neutralized and the salts permitted to remain with the recovered vitamin. The process may be operated continuously and conveniently in a closed system. A high quality substantially vitamin-free casein may be obtained thereby in about five hours; this is an enormous reduction in time that is required by prior art processes.

The new process may be illustrated by means of the accompanying drawings; but is not limited thereto. Figure 1 is a general sketch or flow diagram of the process. A charge of casein 19, in the extractor system 11 is contacted with treating solution, i. e. solvent or solvent plus alkaline agent, which enters the extractor system by means of inlet 18. Fresh solvent, or alkaline agent, or both may be supplied by means of inlet 17. The extract phase passes from the extractor system 11, by means of line 12, to the still 13. There the solvent is vaporized, and if the alkaline agent is volatile, it, too, is vaporized. The vapors pass, by means of line 14, to the total condenser 15, where they are condensed; the condensate passes by means of line 16 to the inlet 18. The still residue contains the vitamin extract; this may be removed as desired, by means of line 20. The process preferably is carried out in a closed system.

Figure 2 is a sketch of an extractor system for one embodiment of the invention in which the casein charge is added as a batch. The casein 19 is held in a container 21, which may be a cloth bag or the basket of a centrifuge. The treating solution (i. e. solvent, or solvent plus alkaline agent) enters the extractor 11 by means of inlet 18, and the extract phase leaves the extractor by means of line 12. When the extraction is complete, the charge of casein is removed.

Figure 3 is a sketch of an extractor system for another embodiment of the invention in which the casein charge is continuously added, and the extracted casein is continuously removed. The treating solution (i. e. solvent, or solvent plus alkaline agent) enters the extractor by means of inlet 18, and the extract phase leaves the extractor by means of line 12. The casein enters the extractor by means of inlet 22, and the extracted casein (raffinate phase) leaves the extractor at outlet 23. The casein may be moved through the extractor by mechanical means, such as conveyor buckets or spiral conveyors; the extractor may be a centrifuge with mechanical means for advancing the casein "cake" from the inlet end to the exit end.

The process of the invention may be conducted in various types of extraction equipment. It is adaptable for use with an enclosed centrifuge wherein the casein may be held in the basket, and the slightly alkaline solvent may be passed therethrough, boiled, recondensed, and recycled. A counter-current process, in which the substrate casein and the solvent are passed through an extractor in different directions, may be employed; in this the raffinate ("devitaminized" casein) will be continuously removed at one zone, and the vitamin-rich extract phase will be removed at another zone of the extractor.

A selective solvent for the vitamins is used; the lower alcohols containing from 1 to 5 carbon atoms per molecule are suitable, and of these, methanol is preferred. Other selective solvents include ketones such as methyl isobutyl ketone, and ethers such as dipropyl ether. The alcohol may be used in a strength in the range of about 100% to about 80%, by volume. Various materials may be used as the alkaline agents, i. e. caustic soda, soda ash, ammonia, amines and the like; however, a volatile agent, such as aqueous ammonia is particularly preferred. Ammonia may be removed from the product by vacuum drying. It also may be recycled with the alcohol in the extraction process.

The amount of alkali, or alkaline agent, to be used will vary, but in general it is such as will not raise the pH of the casein above a point where it loses its granular form. In general this permits the use of a treating solution having an initial pH of 7 to 9. Extraction is substantially complete when the casein has been treated with from 5 to 15 parts by volume of alcohol per part of casein by bulk volume. The extraction temperature is preferably within the range of about 2° to 10° F. below the boiling point of the solvent, at atmospheric pressure. However, other temperatures may be used, as may pressures above or below atmospheric. The amount of solvent to be used, the pH of the solution, the time and treatment temperature are more or less interrelated as will be understood by those skilled in the art in view of the explanation herein.

By employing a solvent such as methanol and an alkaline agent such as ammonia as the treating agent, a particularly fast and complete extraction may be accomplished. The higher the pH, the more rapid is the extraction. Usually a treating solution pH in the range of about 7 to about 9 at the start of the casein treatment will be an optimum value. At the end of the treatment or extraction the pH of the casein should not be above about 6.0. The exact figure will depend on the initial acidity of the casein, its hardness, method of manufacture, the source of the milk and other factors. In general the final pH will not be above about one unit above the iso-electric point of the casein (4.56 to 4.65). As a practical matter the pH must not be above that which will cause the casein to gelatinize, disperse or lump. The individual initial particles should remain as such after the treatment so that they may be treated and handled in the usual manner. This is to be distinguished from prior art processes in which the casein is dispersed with an alkali (connected to a caseinate) and then reprecipitated with an acid as casein leaving a part of the vitamin in the mother liquid. The pH may be determined conveniently by the glass electrode pH meter.

The following example is included in order to illustrate and point out some of the advantages of the invention, but is in no wise to be construed as a limitation of the invention, as otherwise disclosed and claimed herein.

An apparatus was used consisting of an extractor, an extract phase boiler, and a solvent condenser, so arranged and connected that the solvent vapors passed from the boiler to the condenser, the condensate flowed by gravity to the extractor, and the extract flowed by gravity from the extractor to the boiler. 150 pounds of dry granular commercial casein was charged to the apparatus together with 350 liters of methanol. The casein was treated with the methanol at about 5° F. below the boiling temperature of the latter for about 1 hour. The casein was contained in a sturdy cloth bag in the extractor. The methanol was boiled in the boiler, the vapors were condensed, the condensate was passed through the casein, and the extract phase was reboiled after it was withdrawn from the extractor. Then an alkaline agent consisting of 300 cc. of 28% ammonia water dissolved in 1 gallon of methanol was gradually added through an inlet in the top of the extractor, over a period of 1½ hours, while the methanol circulation treatment was continued. The alkaline methanol was then circulated through the system for 4 hours. The pH of the alkaline solution varied from substantially 7 to 9 at the start of the alkaline treatment to about 6.5 to 7.5 at the end of the extraction. The process was terminated by drawing off all the extract from the extractor and shutting off the heat supplied to the boiler. The casein was removed from the extractor and dried in a vacuum oven at about 150° F. The casein product obtained had an excellent appearance. It was in the form of slightly yellowish white granules of uniform color. This product was compared with a commercial so-called devitaminized casein, for vitamin content. The respective analyses follow:

| Vitamin | Untreated Casein | Commercial "Vitamin-Free" Casein | Product of the above example Casein |
|---|---|---|---|
| Riboflavin gamma per gm. casein | 8.0 | 1.5 | 0.9 |
| Niacin, gamma per gm. casein | 2.2 | 1.7 | 0.5 |
| Pantothenic Acid, gamma per gm. casein | 3.4 | 1.1 | 0.4 |

The extract phase contained the crude extracted vitamins. The vitamins may be recovered therefrom by known methods. The vitamins so recovered are suitable for the usual vitamin uses.

If desired, the pH of the final casein product may be adjusted to its iso-electric point by the addition of small amounts of dilute acid, such as acetic, lactic or hydrochloric acid, prior to drying. This may be done by circulating a methanol solution of the acid through the casein, in the system used for the extraction, or a similar system, after the extraction is complete. However, for most purposes, this will not be necessary. The pH of the casein obtained by the process is usually not over one unit above the iso-electric point.

It may be desirable to soak and swell the casein in cold or hot solvent prior to its treatment in the extractor.

The vitamin content of the product prepared in accordance with the invention is much lower than that of the commercial so-called vitamin free caseins. This makes possible much better control in basal feeding diets. The term "vitamin-free," as used herein, is intended to indicate absence of the vitamins which are now known.

In view of the foregoing variations and modifications of the disclosed steps, treating agents, conditions, and the like will be apparent to those skilled in the art. The invention includes all such variations and modifications as fall within the scope of the appended claims.

We claim:

1. A process of separating vitamins from casein containing vitamins which comprises adjusting and maintaining said casein at a pH in the range of 4.7 to 6.0 by treating it with an alkaline methanol solution to form an extract phase, recovering substantially vitamin free casein, and recovering the vitamins originally in the casein charge from the extract phase.

2. A process of separating vitamins from casein containing vitamins which comprises adjusting and maintaining said casein at a pH in the range of 4.7 to 6.0 by treating it with an alkaline methanol solution having an initial pH in the range of about 7 to about 9 to form an extract phase, recovering substantially vitamin free casein, and recovering the vitamins originally in the casein charge from the extract phase.

3. A process of separating vitamins from casein containing vitamins which comprises adjusting and maintaining said casein at a pH in the range of 4.7 to 6.0 by treating it with ammoniacal methanol having an initial pH in the range of about 7 to about 9 to form an extract phase, recovering substantially vitamin free casein, and recovering the vitamins originally in the casein charge from the extract phase.

4. A process of separating vitamins from casein containing vitamins which comprises adjusting and maintaining said casein in a granular form at a pH in the range of 4.7 to 6.0 by treating it with an alkaline methanol solution to form an extract phase, and recovering substantially vitamin free casein by separating the treated casein in the form of individual particles from said extract phase.

5. A process of separating vitamins from casein containing vitamins which comprises adjusting and maintaining said casein in a granular form at a pH in the range of 4.7 to 6.0 by treating it with an alkaline methanol solution having an initial pH in the range of about 7 to about 9 to form an extract phase, and recovering substantially vitamin free casein by separating the treated casein in the form of individual particles from said extract phase.

6. A process of separating vitamins from casein containing vitamins which comprises adjusting and maintaining said casein in a granular form at a pH in the range of 4.7 to 6.0 by treating it with ammoniacal methanol having an initial pH in the range of about 7 to about 9 to form an extract phase, and recovering substantially vitamin free casein by separating the treated casein in the form of individual particles from said extract phase.

SAMUEL M. WEISBERG.
JOSEPH GREENSPAN.

REFERENCES CITED

The following references are of record in the file of this patent:

UNITED STATES PATENTS

| Number | Name | Date |
|---|---|---|
| 2,052,218 | Dickens | Aug. 25, 1936 |
| 2,202,307 | Booher | May 28, 1940 |

OTHER REFERENCES

Day, Journal of Biological Chemistry, vol. 119, page xxii (1937).

Maitra, Biochemical Journal, vol. 33, pages 1648 to 1651 (1939).

U. S. Dispensatory, 22nd ed. (1937), page 1684.